United States Patent [19] [11] 3,860,735
Hoshino [45] Jan. 14, 1975

[54] METHOD OF MANUFACTURING NON-GLUTINOUS RICE CRACKERS

[76] Inventor: Hiroshi Hoshino, 9-9, 1-chome, Maeda, Nagaoka-shi, Nigata-ken, Japan

[22] Filed: Feb. 26, 1973

[21] Appl. No.: 335,512

[52] U.S. Cl. .............................. 426/458, 426/145
[51] Int. Cl. ............................................... A23l 1/10
[58] Field of Search .................. 426/446, 457, 458

[56] References Cited
FOREIGN PATENTS OR APPLICATIONS
343,485    5/1959    Japan
4,015,938  7/1965    Japan

*Primary Examiner*—Raymond N. Jones
*Attorney, Agent, or Firm*—Browdy and Neimark

[57] ABSTRACT

A method of manufacturing non-glutinous rice crackers by milling non-glutinous rice, adding water to the resultant rice powder, kneading and smothering the mixture, treating the smothered paste with water, rolling the resultant paste into a strip-like form, feeding the strip-like paste into a dehydrator at a temperature of 60° to 90°C to reduce the water content in the paste down to 14 to 30 percent, adjusting, if necessary, the dehydrated paste to a hardness suited to high speed cutting, cutting the dehydrated paste in a continuous high-speed cutting process, and drying and baking the resultant material.

3 Claims, 1 Drawing Figure

PATENTED JAN 14 1975  3,860,735
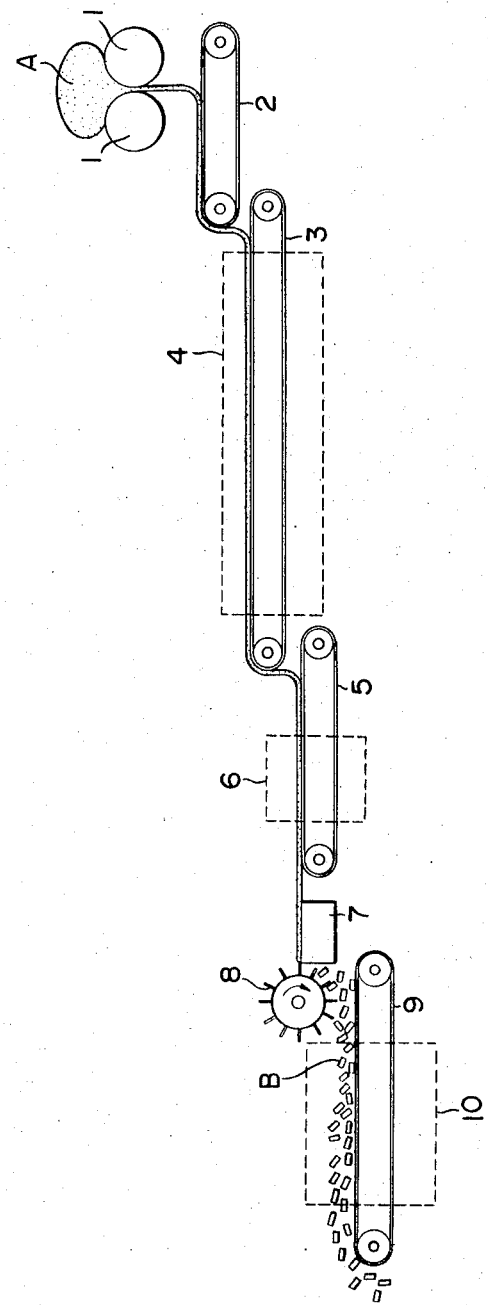

METHOD OF MANUFACTURING NON-GLUTINOUS RICE CRACKERS

BACKGROUND OF THE INVENTION

Rice crackers made from glutinous rice are very tasty and have been popularly eaten by choice. Non-glutinous rice has also been used in place of the glutinous rice, which is rather expensive. However, crackers made from the non-glutinous rice are inferior to the glutinous rice crackers in toughness, hardness and flavor.

Glutinous rice crackers have been usually produced by kneading and smothering milled glutinous rice and water, leaving the resultant smothered paste until it becomes hard, and then cutting and baking the hard material. Recently, a method has been discovered for reducing the solidfying period by forcibly cooling the smothered paste of the glutinous rice, thus realizing a continuous rice cracker manufacturing process. Japanese Patent Publication No. 3485/1959 also discloses a method of manufacturing glutinous rice crackers by rolling the paste of the glutinous rice by passing it through calender rollers forcibly cooling and holding it below the freezing point, the rolled and cooled paste being subsequently fed to a drying chamber at a temperature of 90°C for drying prior to the cutting. With these methods it is possible to manufacture glutinous rice crackers on the mass production basis since the glutinous rice paste is solidified by the cooling step and the following drying step and is then cut in a continuous process. In either method, successful results are obtained with the glutinous rice.

On the other hand, Japanese Patent Publication No. 15938/1965 discloses a method of manufacturing rice crackers from the non-glutinous rice by forcibly cooling the paste of non-glutinous rice and cutting and baking the resultant solidified material. However, crackers actually produced by this method are quite different from the glutinuous rice crackers in that the former crackers are hard and difficultly softened within the mouth.

This significant difference in the quality between glutinous and non-glutinous rice crackers that results even though the solidification by cooling is done in the same way, is attributable to the nature of the starch, which is a major composition of either glutinous rice or non-glutinous rice. The glutinous rice starch substantially consists of amylopectin having a net-like structure and contains almost no amylose of the straight chain form. On the other hand, the non-glutinous rice starch contains 80 percent of amylopectin of the net-like form and 20 percent of amylose of the straight chain form. Accordingly, the glutinous rice paste upon being cooled solidifies without the micelle state being produced. Thus, perfect α-starch results immediately after the baking, so that the glutinous rice cracker will neither be undersirably hard nor difficultly softened within the mouth. On the other hand, in the solidification by cooling of the non-glutinous rice paste, the 20 percent straight chain amylose becomes entwined in the straight chain portions of the net-like amylopectin, resulting in the formation of the micelle, so that β-starch results. Therefore, the non-glutinous rice cracker is undersirably hard and difficultly softened in the mouth.

From the above, the forced cooling or sudden cooling cannot in principle be adopted in the manufacture of non-glutinous rice crackers.

Heretofore, it has been empirically known to manufacture non-glutinous rice crackers by forming the non-glutinous rice paste into the final shape, drying and baking without subjecting the paste to solidifying by cooling. In this method, non-glutinous rice powder and water are kneaded and smothered into a paste-like material, which is then rolled into a strip-like form, and the eventual crackers are immediately stamped from the rolled paste as the paste is moved over a canvas and are then dried and baked to obtain the crackers.

However, even in this method, the residual material after the stamping must be returned for kneading again. Also, in order to stamp the eventual cracker pieces from the strip-like paste immediately after the kneading without causing the worked material to adhere to the stamping die, it is necessary for the paste to have a certain hardness, so that it is impossible to add sufficient water and carry out perfect smothering. Besides, the smothered paste cannot be cut with a cutting blade since it adheres to the blade. Therefore, it is inevitable to resort to the stamping. With this means, however, it is impossible to aim at increasing the speed of shaping the paste and to obtain mass production.

The inventors of this invention have long been working to overcome the prior-art drawbacks inherent in the manufacture of non-glutinous rice crackers so as to be able to manufacture non-glutinous rice crackers having as high a quality as that of glutinous rice crackers in a process taking a reduced period to permit mass production, and have succeeded in achieving this.

OBJECT OF THE INVENTION

An object of the invention is to provide a method of manufacturing non-glutinous rice crackers having excellent flavor comparable to that of glutinous rice crackers.

Another object of the invention is to provide a method of manufacturing non-glutinous rice crackers on a mass production scale by adjusting the non-glutinous rice paste to render it suitable for cutting in a continuous high-speed process.

DESCRIPTION OF THE INVENTION

According to the present invention, there is provided a method of manufacturing non-glutinous rice crackers by milling non-glutinous rice, adding water to the obtained rice powder, kneading and smothering the mixture, treating the smothered paste with water, rolling the resultant paste into a strip-like form, feeding the strip-like paste into a dehydrator at a temperature of 60° to 90°C to reduce the water content in the paste, cutting the dehydrated paste in a continuous high-speed cutting process, and thereafter drying and baking the eventual cracker material in the usual manner. The invention is based upon the finding that it is possible to cut even a perfectly smothered, exceedingly soft paste material in situ in a continuous high-speed cutting process by uniformly dehydrating the paste to reduce the water content down to 14 to 30 percent, desirably to 20 to 24 percent, in a heating process, in which the paste in the strip-like form before the cutting is continuously heated in a dehydrator held at a temperature of 60° to 90°C. This has never been done because it would result in increased tackiness of the paste.

According to the present invention, the water content in the paste is most desirably reduced down to 20 to 24 percent. The paste with such reduced water content can be cut in situ in a continuous high-speed cutting process.

Also, according to another form of the invention, it is possible to further reduce the water content in the paste down to 20 to 14 percent. In such case, the cracks would result in the product if the paste is directly cut, but the cracks may be prevented from occurring by cutting the paste in the continuous high-speed cutting process while holding the temperature of the paste being cut at 70° to 100°C.

Further, according to another embodiment of the invention, the paste with the water content reduced down to 24 to 30 percent can be cut in the continuous process. Although the paste with such water content cannot be cut in situ, since it adheres to the cutting blade, it may be cut without its sticking to the cutting blade by holding its temperature to 5° to 40°C.

Since the method according to the invention does not involve any forced cooling of the paste, the 20-percent amylose content peculiar to the non-glutinous rice will never be suddenly rendered into the micelle form but the whole material gradually solidifies as it becomes $\beta$-starch. Thus, as it is finally baked, it is perfectly fixed as $\alpha$-starch similar to the glutinous rice cracker, so that, similar to the case of the glutinous rice cracker, good fixing takes place at the time of baking and the product has good quality and softens well in the mouth.

Also, since according to the invention the continuous high-speed cutting of very soft paste is made possible by thermally dehydrating the paste, unlike the stamping method, it is possible to manufacture non-glutinous crackers on a mass production basis and with an increased quantity of water to effect perfect smothering of the paste. In the prior art manufacture of nonglutinous rice crackers by the stamping method, where it is necessary for the paste to have sufficient hardness so that it will not stick to the stamping die or the canvas under it, the quantity of water added and the extent of smothering are more or less restricted. Therefore, insufficient $\alpha$-starch paste results, leading to little swelling during the baking and an inferior quality of the product, to difficultly soften in the mouth. In contrast, according to the invention, it is possible to cut soft pastes, even an exceedingly soft paste tending to become flattened when left for a while, so that the quantity of water added can be increased to extend the period of smothering so as to obtain perfect $\alpha$-starch.

According to the invention, the non-glutinous rice is milled for use as the material, so that even the crushed rice can be sufficiently used. Also, since the difference in quality can be eliminated by rendering into perfect $\alpha$-starch, old rice, very old rice and imported rice can be used as the material. Further, it is possible to incorporate powder of other cereals or starch into the materials within a range, in which the essential character of the non-glutinous rice composition is not lost.

The milled non-glutinous rice together with a sufficient quantity of added water is kneaded in a smotherer, is also smothered therein by blowing water vapor thereinto. The paste obtained in this way is then submerged in water for removing its harshness and adjusting its temperature. The resultant paste is then rolled into a strip-like form with a final thickness of 0.7 to 3 mm. The strip-like paste is then directly passed in situ continuously through a dehydrator held at a temperature of 60° to 90°C.

The interior of the dehydrator is designed to be always maintained at a temperature of 60° to 90°C by a heat source such as vapor, gas or electric heater, so that the paste can be uniformly dehydrated as it passes through the dehydrator. If the dehydrator temperature is below 59°C, the dehydration is not obtained. On the other hand, if it exceeds 95°C, a superficial portion of the paste tends to be dried earlier than the rest, sometimes getting scorched, leading to degradated quality of the product.

The dehydrating chamber is not particularly ventilated, since with the ventilation, only the surface would be dried, thus hindering the uniform dehydration.

The dehydrating treatment according to this invention has the object of uniformly dehydrating the nonglutinous rice paste to reduce the water content down to 14 to 30 percent. So long as this object is obtained, a slight temperature gradient or temperature fluctuations within the dehydrating chamber are permissible. For example, the end of the invention can be fully achieved if the dehydrator temperature is 70°C near the inlet and 90°C near the outlet, or if it is 80°C near the inlet and 70°C near the outlet.

According to the invention, the optimum dehydrating effect is obtained when the water content is reduced down to 20 to 24 percent. The dehydrating period substantially depends upon the thickness of the paste being dehydrated. It is about 60 minutes with a standard thickness of 1 to 2 mm at the time of rolling and at a temperature of 70°C. It is also about 60 minutes with a slightly small thickness of 0.7 mm. and at a temperature of 65°C. With a maximum thickness of 3 mm it is increased to 120 minutes at a temperature of 70°C, to 100 minutes at a temperature of 75°C and to about 90 minutes at a temperature of 78°C. To suit the thickness of the paste, the dehydrating period may be adjusted by varying the speed of the conveyor belt passing through the dehydrator. Alternatively, the temperature of the dehydrating chamber may be slightly increased or decreased from 70°C.

The paste with the water content thus reduced down to 20 to 24 percent can be readily cut as it is immediately fed to a cutter operated at a high speed without the paste sticking to the cutting blade at all.

The period for reducing the water content in the paste down to 14 to 20 percent substantially depends upon the thickness of the paste. It ranges from 60 to 100 minutes with the standard paste thickness of 1 to 2 mm and at a temperature of 70°C, and 40 to 80 minutes with a slightly smaller thickness of 0.7 mm and at a temperature of 75°C. With the maximum thickness of 3 mm, it ranges from 120 to 180 minutes at a temperature of 75°C, 80 to 120 minutes at a temperature of 80°C and 60 to 100 minutes at a temperature of 85°C. The dehydration of the paste to further reduce the water content down to 14 to 20 percent is advantageous since the drying (to reduce the water content down to 10 to 14 percent) after the cutting can be readily accomplished.

If the dehydrated paste with the water content reduced down to 14 to 20 percent is cut by the cutting blade in the usual way, it would be prone to cracks and be broken into small pieces. In accordance with this invention, this problem is solved by heating the dehydrated paste with the water content reduced down to 14 to 20 percent to elevate the paste temperature to 70° to 100°C before subjecting it to the continuous high-speed cutting process.

To elevate the temperature of the paste before cutting, various suitable means can be employed either alone or in combination. If the temperature of the paste coming out of the dehydrator is 70° to 90°C, the paste may be directly out at that temperature by arranging the cutter in the vicinity of the outlet of the dehydrator. Also, in such case, it is possible to provide a heater such as an infrared ray lamp at the outlet of the dehydrator so as to increase the paste temperature to 80° to 100°C for cutting the paste while the paste temperature is 70° to 100°C. The paste rapidly falls. Therefore, if the cutter is distant from the outlet of the dehydrator, it is necessary to increase the temperature of the paste merging from the dehydrator to 70° to 100°C before cutting the paste by providing such heating means as an electric heater, gas heater and infrared radiation heater.

The effect of the invention can also be obtained by reducing the water content in the paste down to 24 to 30 percent. As mentioned earlier, the time requirement for the dehydration of the paste substantially depends upon the paste thickness. This time, it is 30 to 50 minutes with the standard thickness of the rolled paste of 1 to 2 mm and at a temperature of 70°C and 20 to 35 minutes with a slightly small thickness of 0.7 mm and at a temperature of 75°C. With the maximum thickness of 3 mm it is 60 to 110 minutes at a temperature of 75°C, 40 to 80 minutes at a temperature of 80°C and 20 to 70 minutes at a temperature of 85°C. Again, this time, the dehydrating period may be adjusted to suit the paste thickness by varying the speed of the conveyor belt passing through the dehydrator, or alternatively the temperature of the dehydrating chamber may be increased or decreased from 70°C. The dehydration of the paste for reducing the water content down to 20 to 34 percent is advantageous since the dehydrating period required is very short.

The dehydrated paste with the water content thus reduced down to only 24 to 30 percent cannot be directly cut in the continuous high-speed cutting process since it would stick to the cutting blade. In accordance with the invention, this problem is solved by lowering the dehydrated paste temperature down to 5° to 40°C, thereby enabling the cutting of the paste with the water content reduced down to only 24 to 30 percent.

To lower the temperature of the paste before the cutting various suitable means can be employed either alone or in combination. If the temperature of the paste coming out of the dehydrator is 60° to 90°C, the cutter may be disposed at a distance from the dehydrator for cooling the paste coming out of the dehydrator with air from a blower before it goes to the cutter. Also, natural cooling of the paste can be obtained by providing enough distance between dehydrator and cutter. If the distance between dehydrator and cutter is small, the paste may be cooled by passing it through a tunnel provided between dehydrator and cutter and cooled with a cooling medium.

In the above manner, even the paste with the water content reduced only down to 24 to 30 percent can be satisfactorily cut without the paste sticking to the cutting blade.

The Drawing shows a schematic sectional view of a system used to carry out the method according to the invention. Paste A is rolled by rollers 1, 1 and transferred in the form of a strip on belt conveyor 2. The strip is transferred on belt conveyor 3 to dehydrator 4 for dehydration. The dehydrated paste from the dehydrator is further transferred on belt conveyor 5 to paste temperature regulator 6, and then it is transferred to the cutter where it is cut on cutter board 7 by cutter blade means 8 rotating at a high speed into paste pieces B. The paste pieces are transferred on belt conveyor 9 to drier 10 for drying. The paste pieces with the water content reduced to 14 to 15 percent in this way may be stored or re-dried to further reduce the water content to the neighborhood or 10 percent for baking.

As has been described, according to the invention, it is possible to manufacture non-glutinous rice crackers of excellent quality comparable to that of glutinous rice crackers. Besides, since the paste with the starch hardened but with the paste state maintained is cut by the cutting blade, unlike the case of stamping by using a roll die, not only soft flavoring material such as shrimp and seaweed but also hard foodstuff such as dried vegetables, such marine plants as sea tangle and ground shoots thereof, dried cuttle fish and pulses may be incorporated into the paste to be cut. Thus, it is possible to produce non-glutinous rice crackers which have a variety of tastes so that they can be served not only as the cracker, but also as various snack foods freely edible by anyone at anytime.

Some specific examples of the invention will now be given.

EXAMPLE I

Cleaned non-glutinous rice was washed with water, and 30 minutes thereafter, it was milled by a roll mill into a powder with a mean grain size of 50 to 60 meshes. 60 kg. of the rice powder thus obtained was then kneaded with 5.5 kg of water in a kneader with a pressure of 0.7 kg/cm$^2$ by adding steam for 9 minutes. The smothered paste thus obtained was then immersed in cold water for temperature adjustment, and then it was rolled with a roller into a strip-like form with a thickness of 1.8 mm and a width of 55 mm. The strip-like paste thus obtained was then fed to a dehydrator at a temperature around 70°C for drying for 60 minutes. When the water content of the paste was reduced down to 22 percent, the paste was cut to a length of 10 mm while holding the paste at a temperature of 48°C. The resultant paste pieces were then further dried to reduce the water content down to 15 percent, and were then baked. The baked crackers were then suitably spiced with such relishes as salad oil and soy to give rice cake flavor.

The crackers obtained in this way were puffy and were excellently softened in the mouth.

EXAMPLE II

Cleaned non-glutinous rice was washed with water, and 30 minutes thereafter, it was milled by a roll mill into a powder with a mean grain size of 50 to 60 meshes. 60 kg of the rice powder thus obtained was then kneaded together with 5.5 kg of water in a kneader with a pressure of 0.7 kg/cm$^2$ by adding steam for smothering for 9 minutes. The smothered paste was then immersed in cooler water for removing its harshness and adjusting it.

The resultant paste was then rolled by a roller into a strip-like form with a final thickness of 1.8 mm and a width of 35 mm. The resultant strip-like paste was continuously passed through a dehydrator with the inner temperature set to about 80°C for 70 hours for uniformly dehydrating the paste until the water content thereof was reduced down to 17 percent.

After the dehydrator, there was provided a cutter provided with an infrared ray heater capable of elevating the temperature of the paste immediately before the cutting to 90°C, and the paste with the water content reduced to 17 percent was passed through the heater. After the paste temperature was elevated by infrared radiation up to 90°C, the paste was cut to a length of 10 mm in a continuous process. The resultant paste pieces were then dried in a continuous process to reduce its water content to 12 percent, and were then baked.

The obtained crackers were satisfactorily puffy and were excellently softened in the mouth.

EXAMPLE III

Clean non-glutinous rice was washed with water, and 30 minutes thereafter, it was milled by a roll mill into a powder with a mean grain size of 50 to 60 meshes. 60 kg of the rice powder thus obtained was kneaded together with 5.5 kg of water in a kneader with a stirring pressure of 0.7 kg/cm² while adding steam for smothering for 9 minutes. The smothered paste was then immersed in cold water for removing its harshness and adjusting it.

The resultant paste was then rolled by a roller into a strip-like form with a final thickness of 1.8 mm and a width of 35 mm. The resultant strip-like paste was continuously passed through a dehydrator with the inner temperature set to about 70°C for 40 minutes for uniformly dehydrating the paste until the water content thereof was reduced to 28 percent.

After the dehydrator, there was provided a cutter provided with a fan capable of cooling the temperature of the paste immediately before the cutting down to 32°C. The temperature of the paste with the water content reduced to 28 percent was reduced by the fan to 32°C, and then the paste was cut to a length of 10 mm in a continuous process. The resultant paste pieces were then dried in a continuous process to further reduce the water content down to 12 percent, and were then baked.

The obtained crackers were satisfactorily puffy and were excellently softened in the mouth.

It is to be understood that the invention is not limited to the embodiments disclosed which are illustratively offered and that modifications may be made without departing from the invention.

What is claimed is:

1. A method of manufacturing non-glutinous rice crackers comprising the steps of:
    milling non-glutinous rice;
    mixing the resultant rice powder with water and kneading the mixture while adding steam until a soft paste is formed;
    immersing the resultant smothered paste in water at a sufficient temperature and time for cooling the paste to remove its harshness,
    rolling the resultant paste into a strip-like form,
    feeding the resultant strip-like paste to a dehydrator held at a temperature of 60° to 90° C. for a period of time sufficient to reduce the water content of the paste down to 20 to 24 percent,
    cutting the dehydrated paste in a continuous high-speed cutting process, and
    thereafter drying to reduce water content in the paste pieces down to 12 percent and baking the resultant paste pieces.

2. A method of manufacturing non-glutinous rice crackers comprising the steps of:
    milling non-glutinous rice;
    mixing the resultant rice powder with water and kneading the mixture while adding steam until a soft paste is formed;
    immersing the resultant smothered paste in water at a sufficient temperature and time for cooling the paste to remove its harshness;
    rolling the resultant paste into strip-like form,
    feeding the resultant strip-like paste to a dehydrator held at a temperature of 60° to 90° C. for a period of time sufficient to reduce the water content of the paste down to 14 to 20 percent;
    increasing the temperature of the dehydrated paste to 70° to 100° C, cutting the heated paste in a continuous high-speed cutting process, and thereafter drying to reduce water content in the paste pieces down to 12 percent and baking the resultant paste pieces.

3. A method of manufacturing non-glutinous rice crackers comprising the steps of:
    milling non-glutinous rice;
    mixing the resultant rice powder with water and kneading the mixture while adding steam until a soft paste is formed;
    immersing the resultant paste in water at a sufficient temperature and time for cooling the paste to remove its harshness;
    rolling the resultant paste into a strip-like form;
    feeding the resultant strip-like paste to a dehydrator held at a temperature of 60° to 90°C. for a period of time sufficient to reduct the water content of the paste down to 24 to 30 percent;
    lowering the temperature of the dehydrated pasted down to 50° to 40° C;
    cutting the cooled paste in a continuous high-speed cutting process; and thereafter
    drying to reduce water content in the paste pieces down to 12 percent and baking the resultant paste pieces.

* * * * *